No. 893,621. PATENTED JULY 21, 1908.
S. H. GARST.
MANURE DISTRIBUTER.
APPLICATION FILED JAN. 19, 1905.

WITNESSES
INVENTOR
STEPHEN H. GARST
BY James Whittemore
ATTY.

No. 893,621.

PATENTED JULY 21, 1908.

S. H. GARST.
MANURE DISTRIBUTER.
APPLICATION FILED JAN. 19, 1905.

INVENTOR
STEPHEN H. GARST.

WITNESSES

BY James Whittemore
ATT'Y.

No. 893,621.　　　　　　　　　　　　　　　　PATENTED JULY 21, 1908.
S. H. GARST.
MANURE DISTRIBUTER.
APPLICATION FILED JAN. 19, 1905.

WITNESSES　　　　　　　　　　　INVENTOR
　　　　　　　　　　　　　　　STEPHEN H. GARST.
　　　　　　　　　　　　　BY James Whittemore
　　　　　　　　　　　　　　　　　ATTY.

UNITED STATES PATENT OFFICE.

STEPHEN H. GARST, OF DETROIT, MICHIGAN, ASSIGNOR TO AMERICAN HARROW COMPANY, OF DETROIT, MICHIGAN, A CORPORATION OF MICHIGAN.

MANURE-DISTRIBUTER.

No. 893,621.   Specification of Letters Patent.   Patented July 21, 1908.

Application filed January 19, 1905. Serial No. 241,826.

*To all whom it may concern:*

Be it known that I, STEPHEN H. GARST, residing at Detroit, in the county of Wayne and State of Michigan, a citizen of the United States, have invented certain new and useful Improvements in Manure-Distributers, of which the following is a specification, reference being had therein to the accompanying drawings.

The invention relates to vehicles intended for the conveyance and distribution of material, such as manure, and the invention consists in certain features of construction, as will be hereinafter set forth.

In the drawings, Fig. 3 is a sectional plan. Figs. 7$^a$, 7$^b$, 7$^c$ illustrates in plan in side elevation and end elevation, the sprocket shown in Fig. 6, together with the chain in engagement therewith. Figs. 8$^a$, 8$^b$ is a plan and modified form of the connections between the sections of the movable bottom.

In general construction, the distributer comprises a box wagon, in which the material is loaded, provided with a movable bottom and a follower at the forward end thereof together with mechanism for drawing the bottom and follower rearward. A rotary distributer is arranged at the rear end of the wagon and is adapted to be revolved simultaneously with the rearward movement of the bottom and follower, so as to pitch the material over the end of the wagon as the latter moves forward. When the follower reaches the rear end, the drive mechanism is automatically reversed, so as to again return the follower to the forward end, ready for the reception of another load.

One of the features of my present improvement is the construction of a body in which A is a substantially U-shaped frame comprising side sills $a$ and a forward cross sill $b$. This frame is supported upon the forward and rear bolsters B and C and is also cross connected by a number of bars D, D' and D$^2$. The sides E of the body rest upon the sills $a$ and are held in position thereon by the posts F which are attached to the sides of the sills.

Figure 1:
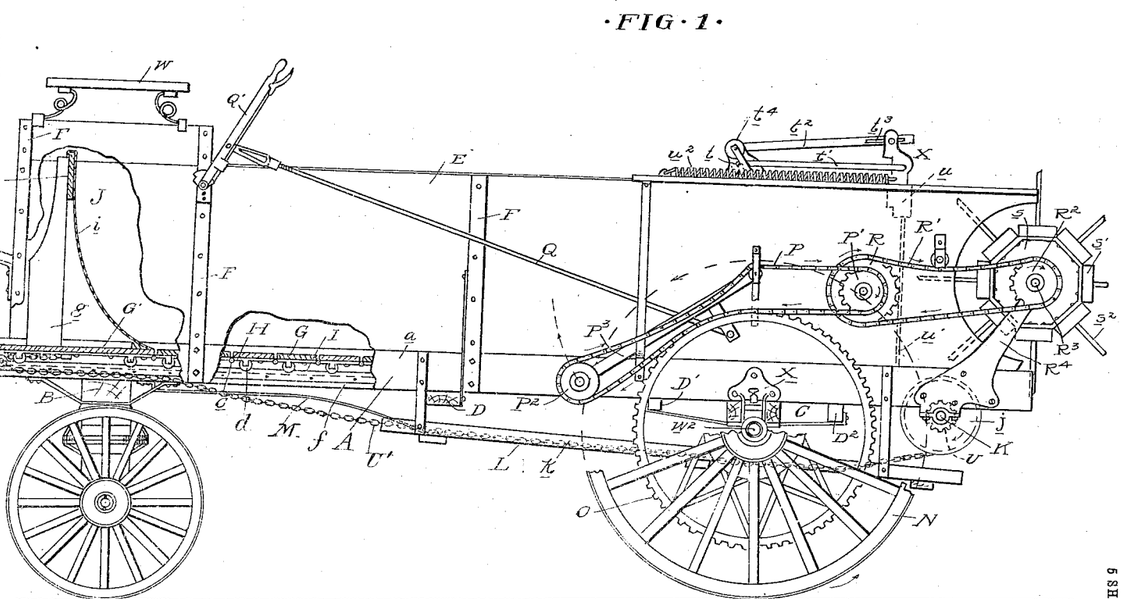
Figure 1 is a sectional side elevation of the machine.
Figure 2:
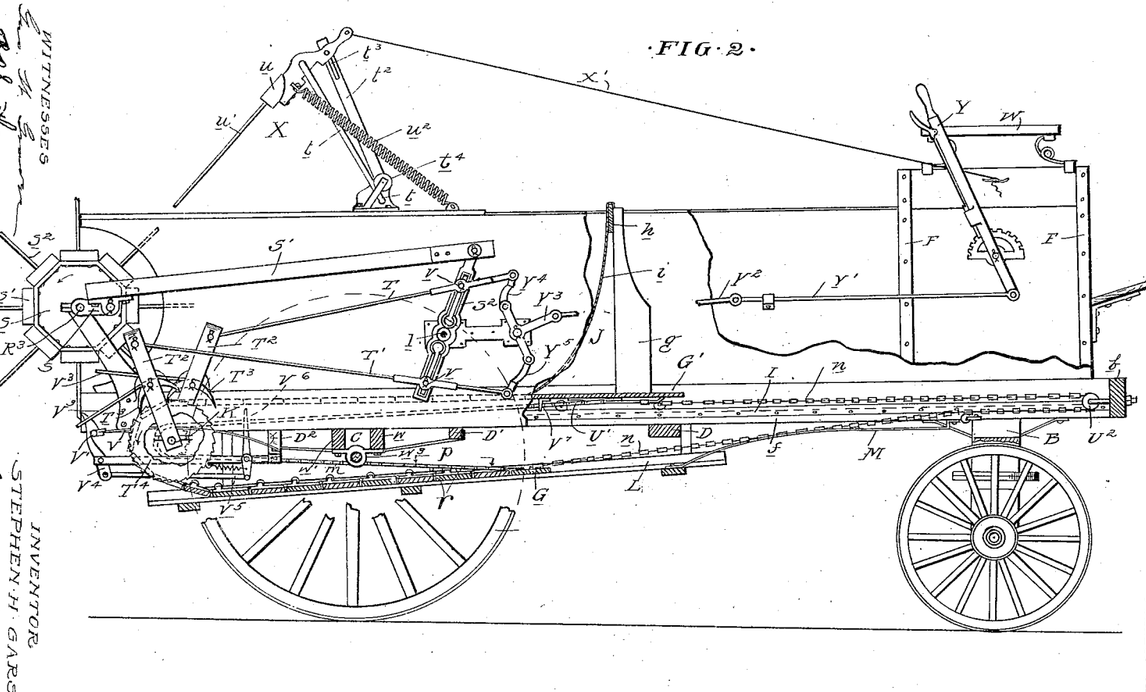
Fig. 2 is a similar view from the opposite side of the machine.

The bottom of the wagon box is formed of a series of cross bars G, which are hinged to each other, so as to permit of drawing the bottom rearward and returning the forward portion thereof below the wagon box. As shown in Figs. 1, 2 and 3, the sections G are connected to each other by links H which are pivoted to each other at $c$ and are also provided with supporting anti-friction rolls $d$. These rolls are adapted to engage longitudinally extending tracks I, mounted upon the bolsters and cross bars of the wagon frame. Four of these tracks are illustrated in the drawings and the central pair I', I have shown as formed of flat metallic bars $e$ secured to the sides of the longitudinally extending wooden bars $f$. These bars $f$ serve to further strengthen the wagon frame, especially in the central portion where subjected to the strain of moving the platform. At the forward end of the platform is a wider section G', upon which is mounted a follower J. This, as shown consists of the upright posts $g$, the cross bar $h$ and the curved plate $i$, which latter extends across the wagon body adjacent to the opposite sides thereof.

K is a shaft journaled in bearings near the ends of the sills $a$, upon which are mounted the rotary heads $j$, around which the sections G of the bottom are adapted to pass.

L is a rack comprising the inclined bars $k$ arranged beneath the sills $a$ upon which the ends of the sections G are supported during the rearward movement of the wagon bottom and follower. The bars $k$ only extend forward for a part of the length of the sills $a$, terminating so as to provide clearance for the turning of the front truck of the wagon. This does not provide sufficient space for the reception of all of the sections of the wagon bottom and to further extend the storage space, curved bars M are arranged at the forward end of the arm L, which extend forward beneath the bars $f$ of the wagon frame and are bent upward to a sufficient degree to clear the wheels of the forward truck, when turned.

With the construction above described, it will be understood that the wagon bottom, when moved rearward, is returned beneath the wagon frame and is supported upon the rack L and extension M thereof. The movement of these parts is effected by mechanism of the following construction:—Adjacent to one of the rear wheels N of the wagon is a sprocket wheel O, which is adapted to be driven by the movement of said wheel during the forward travel of the wagon. P is a sprocket chain for engaging with the sprocket O, which at one end passes around a sprocket P' and at its opposite end around a sprocket $P^2$, which latter is mounted upon a pivotal arm $P^3$ connected by a link Q with a controlling lever Q' the arrangement being such that by movement of the lever Q', the arm $P^3$ may be swung upward or downward, so as to disengage or engage the sprocket chain P and the sprocket O. The sprocket wheel P' is journaled at the side of the wagon body and is connected with a larger sprocket R which engages with a chain R' extending around a sprocket $R^2$ on the shaft $R^3$. The latter is mounted in bearings formed in brackets $R^4$ secured in the side sills $a$ and projecting upward therefrom, the shaft extending completely across the wagon body and having mounted thereon a distributing reel, which will be hereinafter described. At the opposite end of the shaft $R^3$ is a crank S, to which is connected a pitman rod S' extending forward and connected with a lever $S^2$. This lever is centrally fulcrumed at $l$ to the side of the wagon body and is adapted to be reciprocated by the rotation of the crank S through the medium of the pitman S'. T and T' are link rods connected at one end with rock arms $T^2$, fulcrumed on the shaft K and adjustably connected to the lever $S^2$ upon opposite sides of its fulcrum. The rock arms $T^2$ carry double pawls $T^3$ which are adapted to engage with ratchet wheels $T^4$ each having double and oppositely faced sets of teeth and secured to the shaft K, so that reciprocation of the lever $S^2$ and consequent reciprocation of the rock arm $T^2$ will cause the rotation of the shaft K through the medium of the pawls $T^3$ engaging with the ratchet wheels $T^4$. Thus, the rotation of the wheel N during the forward movement of the wagon, will be transmitted through the sprocket O, chain P, sprockets P' and R, chain R' and sprocket $R^2$ to the shaft $R^3$ and the rotation of the latter will actuate the crank S, pitman S' and lever $S^2$, so as to cause the opposite reciprocation of the rods T and T' and the alternate actuation of the ratchet wheels $T^4$, which rotate the shaft K.

The shaft K has mounted thereon the sprocket wheel U, which engages with an endless chain U', extending to the forward end of the wagon frame and around an idler sprocket $U^2$. This chain is connected with the section G' of the bottom, so that the rotation of the shaft K will cause the movement of the bottom and follower J.

As has been stated, in the operation of the machine, the traveling bottom and follower must first be moved rearward during the distribution of the load and then returned to the original position ready to receive another load. This necessitates the reversing of the direction of the rotation of the shaft K and this is effected automatically upon the completion of the rearward movement of the follower through the following mechanism:— V is a spring arm arranged adjacent to the ratchet wheel $T^4$, preferably extending between said wheels, as shown in Fig. 3. V' is a cross head secured to the end of the bar V and $V^3$ are arms attached to the pawls $T^3$ and extending into the path of the cross head V'. $V^4$ is a catch lever adapted to engage with the end of the bar V' and hold the latter in a depressed position, and under tension. $V^5$ is a link connecting the catch lever $V^4$ with a trip lever $V^6$, which latter extends in the path of a lug $V^7$ on the section G' of the wagon bottom. The construction of parts is such that whenever the lug $V^7$ actuated the trip lever $V^6$, this occurring at the completion of the rearward movement of the follower, the catch lever $V^4$ will be withdrawn from engagement with the spring bar V, which will permit the latter to fly upward, causing the cross head V' to strike the arms $V^3$, thereby rocking the pawls $T^3$, so as to change the direction of feed of the ratchet wheels $T^4$. As a consequence, a reverse rotation will be imparted to the shaft K and sprocket U, which will cause the follower and wagon bottom to be returned.

It has been stated that the movement of the lever Q' which is adjacent to the driver's seat W on the wagon body, will cause the swinging of the arm $P^3$, so as to engage or disengage the sprocket chain P and sprocket O. Thus, the driver can, at any time, throw the mechanism driven through the chain P, in or out of operation by the adjustment of the lever and after the load has been distributed and the bottom and follower returned, this lever being moved to stop the mechanism. Inasmuch, however, as it would be difficult for the driver to throw the mechanism out of operation at the exact instant when the follower has completed its return movement, I provide means whereby any further movement of the mechanism after the return of the follower will automatically disengage the sprocket U from the chain U', thereby preventing breakage of parts. This mechanism is of the following construction:—The chain U' is preferably formed in two sections, the sections $m$ being the sprocket chain and the section $n$ being the return chain or cable which does not engage with the sprocket. Each of these sections is connected with the bottom board G', the sprocket chain being preferably provided with a yielding connection formed by the lever $o$ and spring $o'$ indicated in Fig. 12 and in dotted lines in Fig. 3. At their opposite ends, the sections $m$ and $n$ are connected to each other through the medium of a double chain $p$, which passes around the shaft $k$ upon opposite sides of the sprocket. Thus, the chain will only be driven during the engagement of the sprocket with the sections $m$ and as soon as the last link of this section disengages from the sprocket, which occurs at the completion of the return movement of the follower, the chain becomes stationary. When, however, the chain $m$ is thrown out of engagement with the sprocket, it cannot be reëngaged merely by the reverse movement of said sprocket and I have therefore provided means for effecting this reëngagement, which are of the following construction:—$q$ are ratchet wheels upon opposite sides of the sprocket U and double chain $p$. $r$ are cross bars connecting the two portions of the double chain $p$ and extending into engagement with the ratchet wheels $q$. The latter are preferably provided with only two teeth or shoulders, which are arranged to engage with the cross bars $r$ during the initial rotation of the shaft K in the direction for driving the bottom and follower rearward. In the reverse rotation of the shaft, the cross bars $r$ will not be driven but will merely be moved outward by a am portion $q'$ connecting the two teeth. Thus, after the section $m$ of the chain disengages from the sprocket in the forward movement of the follower, any further rotation of the shaft K will not drive the chain but immediately upon the reversal in the direction of rotation, the ratchet wheels $q$, engaging with the cross bars $r$, will draw upon the chain so as to reëngage the sections $m$ thereof with the sprocket.

The spreading or distribution of the material is effected by a rotary fork or tined spreading wheel, which is mounted upon the shaft $R^3$, as has been described. This spreading wheel preferably comprises polygonal heads $s$ mounted upon the shaft $R^3$, to which are attached cross bars $s'$, each cross bar being provided with a series of radially projecting tines $s^2$. The wheel is revolved during the operation of the mechanism driven by the chain P in the direction in which the tines $s^2$ travel upward on the inner side of the wheel, i. e. adjacent to the material in the wagon box.

To regulate the amount of feed, an adjustment is provided for changing the speed of travel of the wagon bottom and follower and, further, a retaining fork X is arranged adjacent to the distributing wheel which regulates the amount fed thereby. This retaining fork X is preferably of the following construction:—$t$ are brackets secured to the side boards of the wagon body, each of which has pivotally secured thereto a pair of rock arms $t'$ and $t^2$. $u$ is a cross bar forming a rake head and provided with projecting tines $u'$, said bar being pivotally supported at the outer end of the arms $t'$ and $t^2$ being pivoted on $t'$ and slidingly connected to $t^2$. The construction is such that by swinging the arms $t'$ and $t^2$, cross bar $u$ and tines $u'$ may be adjusted into the positions shown, either in dotted lines in Fig. 1, where the ends of the tines are adjacent to the wagon bottom, or in the position shown in full lines in Fig. 2, where the ends of the tines are adjacent to the distributing wheel and are arranged in an inclined position. In the latter position, the tines $u'$ are preferably slightly spaced from the tines $s^2$ of the distributing wheel, so that the material carried by the latter can pass out through this space, but the tines $u'$ will prevent the passage of more than the desired amount. $u^2$ is a spring connected to the cross bar $u$ and to the wagon body, being so arranged to the pivots of the arms $t'$ and $t^2$, so as to hold the retainer fork X in either position of adjustment. This spring also serves to yieldingly hold the tines $u'$ from lateral movement, a limited movement of the tines being permitted by the slot $t^3$ in the arms $t^2$, with which the pivotal connection from the bar $u$ engages.

The speed of travel of the bottom and follower may be varied by adjusting the engagement of the links T and T' with the lever $S^2$ towards or from the fulcrum of said lever. To place this adjustment under the control of the driver, a lever Y is placed adjacent to the driver's seat and is connected by a rod Y' and link $Y^2$ with a bell crank lever $Y^3$. This lever is arranged adjacent to the lever $S^2$ and is of substantially T-shaped form, the two oppositely extending arms of the T being connected by links $Y^4$ and $Y^5$ with the ends of the links T and T', respectively. Thus, by adjusting the lever Y, the lever $Y^3$ is rocked, so as to draw the links T and T' towards or from the fulcrum of the lever $S^2$, said lever being longitudinally slotted to permit a movement of the pivots $v$. It is obvious that farther out, the links T and T' are adjusted adjacent to the levers $S^2$ and thus, a greater movement will be imparted to the rock arms $T^2$ and to the shaft K and sprocket U. On the other hand, when the links are adjusted near the center or fulcrum of the lever, the movement is reduced to the minimum.

The rear bolster C is preferably formed of two separated cross bars $w$ and $w'$ and a shaft or axle $w^2$ is secured to these cross bars by a central bearing $w^3$. The opposite ends of the shaft are also journaled in bracket bearings $x$ which are also provided with flanges $x'$ bolted or otherwise rigidly secured to the side sills $a$ and with the horizontal flanges $x^2$ secured to the under side of the bars $w$ and $w'$. This construction forms both a strong support for the wagon frame and a construction in which the shaft $w^2$ is held from flexing by the two under bearings and the center bearing $w^3$.

The parts being constructed as shown and described, in operation, the initial adjustment of parts is as shown in Fig. 1, where the follower J is at the forward end of the wagon body and the wagon bottom extends for the complete length of the body. The retainer X is also adjusted, so as to form a gate at the rear end of the wagon body adjacent to the spreader wheel. A load of the material to be spread is then placed in the wagon box and carried to the place where it is to be distributed. Before distributing, the operator draws up the retainer X into the position shown in Fig. 2, the movement being imparted by the cord $X'$ extending into and in proximity to the driver's seat W. He then adjusts the lever $Q'$, so as to rock the rock arm $P^3$ and throw the chain P into engagement with the sprocket wheel O. This will impart movement of the drive train, revolving both the shaft $R^3$ and the shaft K, the former rotating the distributing wheel and the latter the sprocket U, which actuates the chain $U'$ and causes the rearward feeding of the bottom and of the follower J. This movement will gradually feed the load rearward and, as fast as it is thus fed, the tines $s^2$ of the distributing wheel will pick it up and pitch it from the rear end of the wagon as it travels along. The amount of material fed in this way may be changed by the adjustment of the lever Y, which as before described, varies the distance of the pivots $v$ from the fulcrum of the lever $S^2$ and changes the degree of movement imparted to the shaft K.

During the movement of the follower and wagon bottom rearward, the latter passes around the heads $j$ onto the rack L and is drawn forward on said rack and upon the extension M thereof until the rearward movement of the follower is completed. When this occurs, the stop $V^7$ engages with the trip lever $V^6$, which disengages the catch $V^4$ and permits the spring arm V to shift the pawls $T^3$, so that the continued movement of the rock arm $T^2$ will impart a reverse rotation to the ratchet wheels $T^4$ and the shaft K, to which they are secured. This will reverse the movement of the follower and wagon bottom, so as to return them to the initial position and at the completion of this return movement, the chain will disengage from the sprocket U in the manner above described.

The driver may then adjust the lever $Q'$, so as to withdraw the chain P from the sprocket O and prevent further movement of the drive train.

Figure 8:
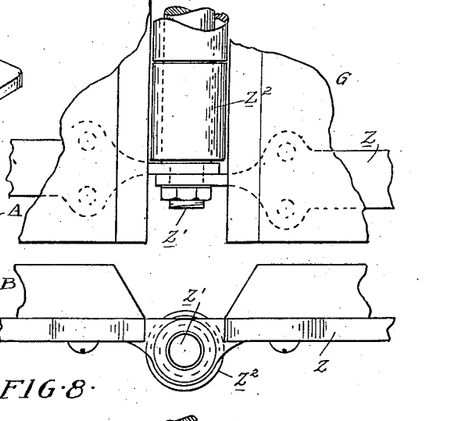

During the travel of the sections G of the wagon bottom, they are supported by the anti-friction rolls $d$, which engage with the tracks I and thereby reduce the friction and the amount of power required to move the bottom under load. In place of this construction, I may employ the modified construction illustrated in Fig. 8, in which $z$ are the hinged fittings connecting the bottom sections G and projecting laterally therefrom, so as to leave spaces between said sections. $z'$ are shafts extending through the fittings $z$ and forming pivots therefor and $z^2$ are sleeves formed in short sections arranged adjacent to each other upon the shafts $z'$. With this construction, the sleeves $z^2$ rest upon the tracks and the material is prevented from passing between the sections G by said sleeves which fill the spaces between said sections.

In order to regulate the amount of material distributed by the rotary distributing wheel, the retainer X is adjusted, so that the end of the tines $u'$ are nearer or farther from the path of the tines $s^2$ of the wheel. For effecting this adjustment, a stop is provided for the rock arm $t'$, which is preferably an eccentric collar $t^4$, sleeved upon the bolt $t^5$, which forms the pivot for the rock arm $t^2$. This collar $t^4$ is held in different positions of adjustment by radial teeth $t^6$, which engage with a correspondingly notched hub $t^7$ on the brackets $t$. Thus, by loosening the bolt $t^5$, the collar $t^4$ may be rotated to change its relation to the rock arm $t'$ and thereby adjusting the retainer X into different positions.

Figures 9, 10, 11, 12:
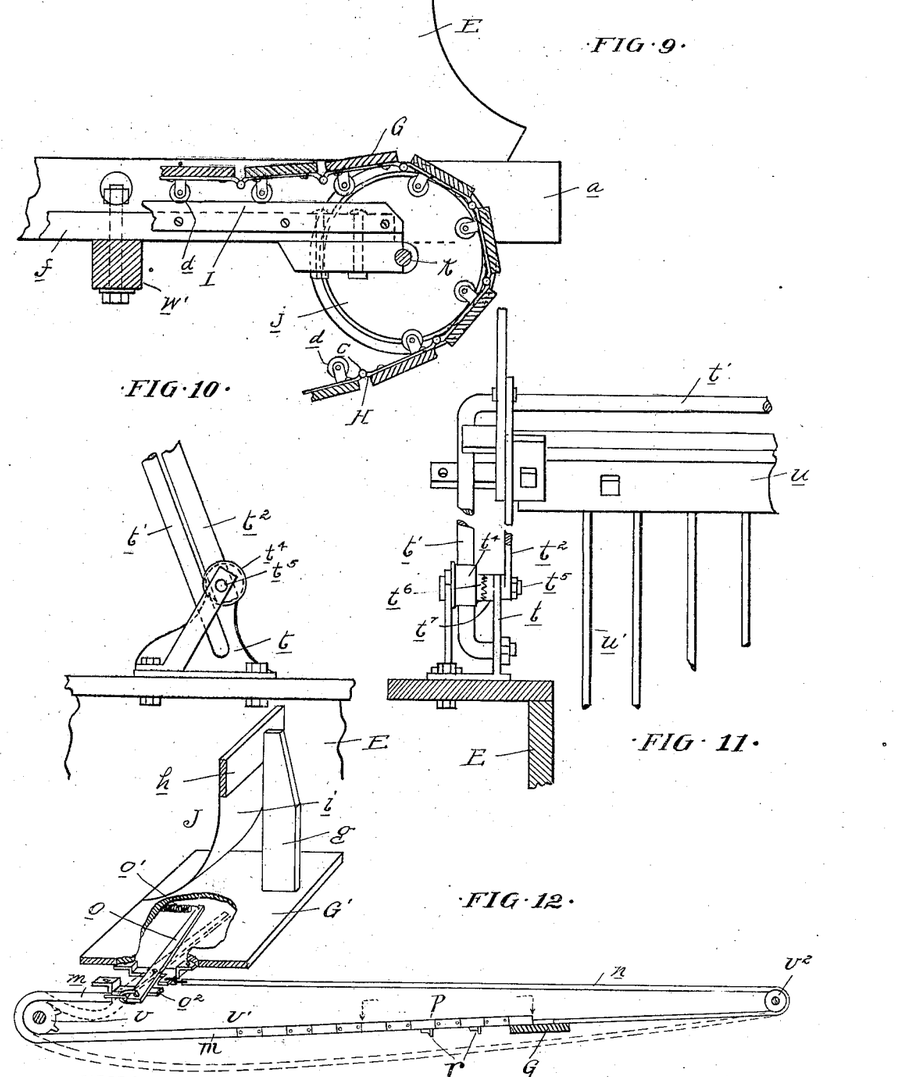
Fig. 9 is a longitudinal section through the rear end of the frame and movable bottom.
Fig. 10 is a side elevation of the connection for the adjustable end gate.
Fig. 11 is an elevation at right angles to Fig. 10.
Fig. 12 is a diagrammatic view, illustrating the automatic chain take up device.
Figure 13:
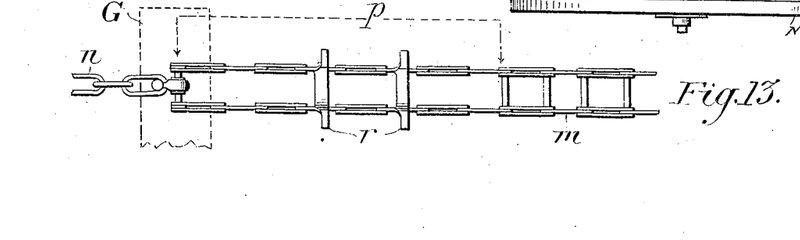
Fig. 13 is a plan view of a portion of the chain connection.

As has been described, the bars G of the movable bottom are supported upon the tracks I by the anti-friction rolls $d$ and when these members pass around the shaft K, they are supported by the rotating head $j$. The sprocket U for driving the movable bottom is of lesser diameter than these heads $j$ and to avoid friction, the latter are journaled loose upon the shaft K, so that they may turn at a different angular speed. To avoid danger of catching upon the ends of the tracks I when the bottom is traveling back towards its initial position, the circle of the heads $j$ extends above the normal level of the bottom when supported on the tracks I, as shown in Fig. 9. This causes the members G to be lifted from the track in leaving and before reëngaging therewith.

When the follower is traveling rearward, the chain $m$ is under tension and to provide the necessary slack in the return chain, the yielding lever $o$ is connected to the end of the chain $m$, as has been previously described. In the return movement, the chain $n$ is under tension and the load upon the chain $m$ is relieved. This would tend to permit the chain m to drop in the loop over the sprocket U, as shown in dotted lines in Fig. 12, and such a result is prevented by the spring o', which shifts the lever o and automatically takes up the slack in the chain. A stop o² limits the movement of the lever o.

It is desirable to drive the distributing wheel at considerable speed, and where the driving is effected by the truck chain connection between the axis of said wheel and the sprocket on the ground wheel, the latter needs to be of a size nearly equal in diameter of the ground wheel itself. With such a construction, the sprocket wheel is so near the ground as to be constantly filled with dirt, which interferes with its operation. To avoid this result, I have reduced the diameter of the sprocket wheel O, which is actuated by the ground wheel and I form a drive connection by the two chains P and R' with the intermediate step up gearing, formed by the sprockets P' and R. Such a construction not only furnishes the requisite speed from the smaller drive sprocket wheel, but also this smaller drive sprocket wheel is better adapted to coöperate with the rock arm P³ and chain P.

Figure 4:
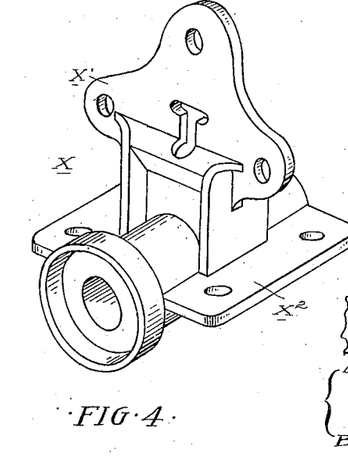
Fig. 4 is a perspective view of one of the supporting bearings for the axle.

The construction of the rear bolster and of the bracket bearing $x$ is such as to obtain great strength and rigidity. It is to be noted that the bracket $x$ is attached by the flange $x'$ to the side sills of the frame and by the flanges $x^2$ to the cross bars $w$ and $w'$. The latter are strengthened by the longitudinal members $f$ secured thereto and which are also connected to the cross bars D. Thus, the load which tends to buckle the axle downward and to twist the bracket bearing $x$ is resisted by the construction described, the cross bars $w$ and $w'$ preventing the twisting of the fitting $x$ and the longitudinal bars $f$ resisting the flexing of the bars $w$ and $w'$.

Figure 5:
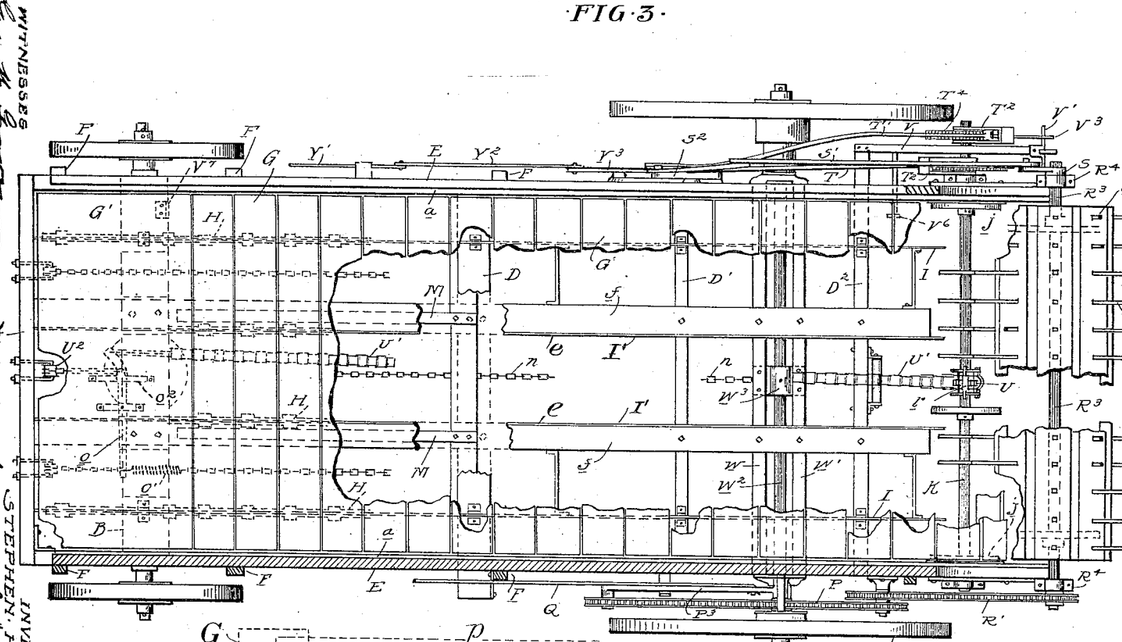
Fig. 5 is a cross section, illustrating the manner of supporting the movable bottom.
Figures 6, 7:
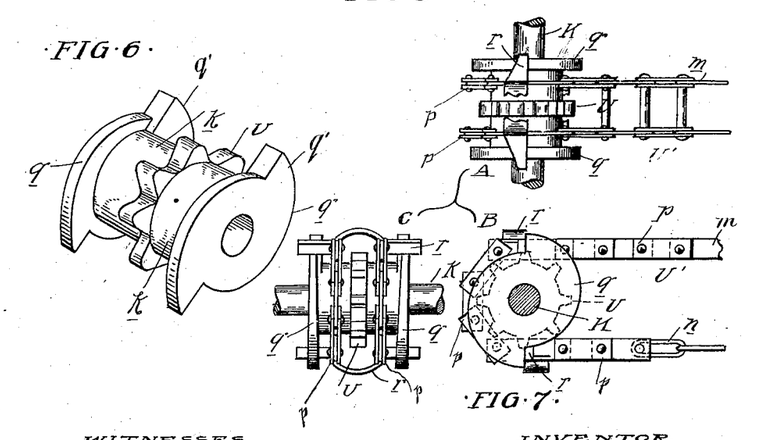
Fig. 6 is a perspective view of the sprocket and automatic chain disengaging mechanism for operating the movable bottom.

It will be observed that the rolls $d$ are flanged, as illustrated in Fig. 5, and also that they are journaled in bearings on the cross bars G, adjacent to one edge thereof. This prevents the tipping of the bars G, as one edge is supported by the roll directly attached thereto and the opposite edge by the roll of the next adjacent bar, while the two bars are connected to each other by the hinged fitting $c$.

What I claim as my invention is:—

1. In a distributing wagon, the combination with a body and a distributing wheel at the rear end thereof, of a retainer comprising a fork, the rock arms $t'$, $t^2$ pivotally connecting with said fork and adapted to carry the same from the position in front of said distributing wheel to an inclined position, the arm $t^2$ having a slotted bearing $t^3$ for the pivot and a spring $w^2$ for holding said fork in either position of adjustment and for yieldingly holding the same in an inclined position.

2. In a distributing wagon, the combination with a body, a distributing wheel at the rear end thereof and a movable bottom for feeding the load to said wheel, of means for variably feeding said movable bottom comprising a crank driven from one of the ground wheels, a shaft connected to said bottom, a pair of ratchet rock arms for actuating said shaft, a pitman connected to said crank, a rock lever operated by said pitman, a pair of links connecting said ratchet rock arms with said lever on opposite sides of the fulcrum thereof and means for adjusting said links towards or from the fulcrum of said lever to vary the movement of said ratchet arms.

3. In a distributing wagon, a variable feed mechanism for the movable bottom comprising the crank S, the pitman S', the lever S², the links T, T', the rock arms T², the pawls T³, the ratchet wheels T⁴, the rock arm Y³ having the links Y⁴ and Y⁵ connected to the links T, T' and the pivots $v$ connecting said links T, T' with the lever S² and having a slotted engagement with the latter.

4. In a distributing wagon, the combination with a body and a distributing wheel at the rear end thereof, of a movable bottom for said body, an endless carrier chain connected with said bottom, a sprocket engaging said chain and adapted to feed the same, means for rotating said sprocket adapted to automatically reverse the direction of rotation upon the completion of the rearward movement of said bottom to return the same to its initial position and means for disengaging said sprocket from said chain at the completion of the return movement adapted to automatically reëngage upon the reversal of said sprocket.

5. In a distributing wagon, the combination with a wagon body, a distributing wheel at the rear end thereof, of a movable bottom for said body, a sprocket chain connected to the forward end of said movable bottom and extending rearward therefrom, a sprocket at the rear end of said body engaging with said chain, a flexible return connection for said movable body, an idler wheel at the forward end of said body, around which said return connection is passed, and a ratchet chain connection between said sprocket chain and return connection, whereby when said bottom is returned, said ratchet chain will disengage from said sprocket, but will reëngage upon the reversal of said sprocket.

6. In a distributing wagon, the combination with a body and a distributing wheel, of a movable bottom and sprocket chain attached thereto, a sprocket with which said chain engages, a flexible return connection for said bottom, the connection between said sprocket chain and return connection passing around said sprocket on opposite sides of the teeth thereof, a cross bar on said connection clearing the teeth of said sprocket and a tatcher wheel for engaging said cross bar, whereby in the rotation of said sprocket and ratchet wheel in one direction, said chain will be disengaged therefrom and the further rotation of the wheel is permitted and upon the reversal of direction of rotation, said ratchet wheel coöperating with said cross bar will immediately reëngage said chain with the sprocket.

7. In a distributing wagon, the combination with a body, of a distributing wheel and a movable bottom, of the chain U′ for moving said bottom, comprising the sprocket chain $m$ and return chain $n$, the sprocket U having the ratchet wheels $q'$ on opposite sides thereof, and a double chain connection between the sections $m$ and $n$ having the cross bars $r$ bent to clear the teeth of the sprocket and adapted to engage with said ratchet wheels, substantially as and for the purpose set forth.

8. In a distributing wagon, the combination with a body and a distributing wheel at the rear end thereof, of an adjustable retainer fork, the rock arms $t'$ $t^2$ for swinging said fork, towards or from said distributing wheel and an adjustable stop for limiting the movement of said rock arms away from said wheel.

9. In a distributing wagon, the combination with a body and a distributing wheel at the rear end thereof, of a retainer comprising a fork, the rock arms $t'$ and $t^2$ pivotally connected with said fork and adapted to carry the same from a position in front of said distributing wheel to an inclined position, an eccentric collar sleeved on the pivot for the rock arm $t^2$ and forming a stop for the rock arm $t'$ which is shifted into position by rotation and clamping means for holding said stop in different positions of adjustment.

10. In a distributing wagon, the combination of a body and a reversible movable bottom therefor, of a sprocket at one end of said body and an idler wheel at the opposite end thereof, a chain connected to said movable bottom and passing around said sprocket, an idler and a yielding connection between said movable bottom and the end of said chain, leading direct to said sprocket, whereby slack is provided in said chain during the feeding movement of said bottom and automatically taken up during the return movement.

11. In a distributing wagon, the combination with the body and a movable bottom therefor, of tracks over which said bottom is adapted to travel and rotary heads at the rear end of said bottom around which said bottom passes, said heads being arranged to lift said bottom from said tracks, substantially as set forth.

In testimony whereof I affix my signature in presence of two witnesses.

STEPHEN H. GARST.

Witnesses:
C. L. READ,
J. F. SHEEN.